(12) United States Patent
Park et al.

(10) Patent No.: US 11,282,275 B1
(45) Date of Patent: Mar. 22, 2022

(54) APPARATUS AND METHOD FOR GENERATING STORYBOOK

(71) Applicant: ILLUNI INC., Seoul (KR)

(72) Inventors: Byunghwa Park, Seoul (KR); Youngjun Kwon, Seoul (KR); Gabee Jo, Gyeonggi-do (KR)

(73) Assignee: ILLUNI INC., Seoul (KR)

( * ) Notice: Subject to any disclaimer, the term of this patent is extended or adjusted under 35 U.S.C. 154(b) by 0 days.

(21) Appl. No.: 17/116,060

(22) Filed: Dec. 9, 2020

(30) Foreign Application Priority Data

Nov. 17, 2020 (KR) .................. 10-2020-0153730

(51) Int. Cl.
*G06T 17/20* (2006.01)
*G06T 11/60* (2006.01)
*G06T 19/20* (2011.01)

(52) U.S. Cl.
CPC .............. *G06T 17/20* (2013.01); *G06T 11/60* (2013.01); *G06T 19/20* (2013.01); *G06T 2219/2021* (2013.01)

(58) Field of Classification Search
CPC ......... G06T 17/20; G06T 11/60; G06T 19/20; G06T 2219/2021; G06T 2219/2004; G06T 13/80; G06T 7/00; G06K 9/00; G06K 9/00221; G06K 9/00288; G06K 9/00308; G06Q 50/10; G06Q 30/06; H04N 21/854; H04N 21/4532; H04N 21/84; G06F 40/166
See application file for complete search history.

(56) References Cited

U.S. PATENT DOCUMENTS

| | | | |
|---|---|---|---|
| 8,391,642 B1 * | 3/2013 | Petruszka | G06K 9/00295 382/285 |
| 2014/0088750 A1 * | 3/2014 | Sharma | H04N 1/387 700/118 |
| 2015/0143209 A1 * | 5/2015 | Sudai | G06F 40/186 715/202 |
| 2016/0027200 A1 * | 1/2016 | Corazza | G06K 9/00362 345/420 |
| 2016/0211001 A1 * | 7/2016 | Sun | G11B 27/3081 |
| 2016/0313966 A1 * | 10/2016 | Jeong | G06F 1/165 |

FOREIGN PATENT DOCUMENTS

| | | |
|---|---|---|
| KR | 10-2002-0025916 | 4/2002 |
| KR | 20-0481226 | 8/2016 |
| KR | 1020170002100 A | 1/2017 |
| KR | 101902553 | 9/2018 |
| KR | 10-2019-0120611 | 10/2019 |
| KR | 1020200121139 | 10/2020 |

* cited by examiner

*Primary Examiner* — Xilin Guo
(74) *Attorney, Agent, or Firm* — Burris Law, PLLC (57) ABSTRACT

A method for generating a storybook includes generating metadata including shape information which is a predefined value for specifying a shape that a character model has in each of scenes in which a character of storybook content appears, receiving a facial image of a user, generating a user model based on a user face by applying texture information of the facial image to the character, generating a model image of the user model having a predefined shape in each of the scenes by reflecting shape information predefined in each of the scenes into the user model, and generating a file printable on a certain actual object to include at least one of the model images.

15 Claims, 10 Drawing Sheets

APPARATUS AND METHOD FOR GENERATING STORYBOOK

CROSS-REFERENCE TO RELATED APPLICATION AND PRIORITY

This application claims priority to and the benefit of Korean Patent Application No. 10-2020-0153730, filed on Nov. 17, 2020, the disclosure of which is incorporated herein by reference in its entirety.

BACKGROUND

Field

The present disclosure relates to an apparatus and method for generating a storybook reflecting a user's face in a character, and more particularly, to a technology for reflecting expressions and shapes of a storybook character in a user's facial image to generate a new image and providing the generated image in a form attachable to an actual storybook to generate a custom storybook.

Discussion of Related Art

Recently, with the development of various multimedia devices, such as smart phones and tablet personal computers (PCs), digital storybooks have been appeared to enable people to access fairy tale books through the multimedia devices.

Since these digital storybooks are implemented through multimedia devices, it is possible to easily apply additional content reflecting information of users to the digital storybooks. For this reason, personalized content, realistic content, etc. have appeared so that users can have a realistic feeling about content by inserting information of the users (faces, voices, names, etc.) to digital storybooks.

Meanwhile, multimedia devices have side effects of adversely affecting babies and children. For example, the side effects include digital addiction, which may develop when a baby or child who lacks self-control uses a multimedia device, eyesight deterioration, which is caused by a light-emitting display installed in a multimedia device, and the like.

Since digital storybooks can be only used through multimedia devices, demand for paper fairy tale books still remains due to the above-described influences of multimedia devices on babies and children.

In addition, even with regard to paper fairy tale books, there is demand for personalized content obtained by inserting information, such as a user's face, to a character. However, paper fairy tale books are manufactured through printing, and thus, when fairy tale books are manufactured to reflect each individual user, it is necessary to newly print pages reflecting a user's face user by user, which leads to a surge in manufacturing costs.

SUMMARY

The present disclosure is directed to providing a technology for manufacturing a paper storybook which reflects a user's face without increasing manufacturing costs for printing even in the form of a paper fairy tale book.

In particular, the present disclosure is directed to providing a technology for generating new images by reflecting, in a user's facial image, various expressions and shapes applied to a character in every scene of a basic storybook in which the character appears and producing the generated new images in a printable form which may be attached to the basic storybook.

Also, the present disclosure is directed to providing a technology for automatically generating a custom storybook and character stickers which reflect information of each user from only a facial image input by the user.

However, technical objects of the present disclosure are not limited to those mentioned above, and various technical objects may be derived from the following description within a range apparent to those of ordinary skill in the art.

An apparatus for generating a storybook according to an exemplary embodiment of the present disclosure generates new images by reflecting, in a user's facial image, expressions and shapes applied to a character in every scene of a storybook in which the character appears and provides stickers which reflect the user's facial image in a form directly attachable to a paper storybook. When facial images are input from various users, the technology applies the above-described operation to each of the facial images. Accordingly, a custom storybook which reflects information of each user can be generated through an automated process, and it is possible to automatically generate a printable file such as a character sticker reflecting a user's face.

In this way, even in the case of providing a storybook obtained by inserting each individual user's facial information to a paper fairy tale book, it is unnecessary to print a book including each individual user's image for the individual user, and it is possible to print a large number of basic storybooks and then provide stickers which reflect each individual user's facial image together.

Accordingly, each individual user does not need to individually order printing of a storybook for himself or herself and can order a personalized storybook of which price is reduced by receiving stickers reflecting the user's facial image together with a basic storybook. Also, a user can make a personalized storybook using stickers reflecting his or her own facial image and thus can be further interested in the storybook.

Further, a storybook producer can automatically generate a custom storybook and character stickers which reflect information of a user from only a facial image input by the user. Consequently, it is possible to effectively and remarkably reduce time and costs for generating a custom storybook and character stickers.

In some embodiments, a method for generating a storybook performed by a storybook generation apparatus to generate a storybook includes steps of: generating metadata including shape information which is a predefined value for specifying a shape that a character model has in each of scenes in which a character of storybook content appears; receiving a facial image of a user; generating a user model based on a user face by applying texture information of the facial image to the character; generating a model image of the user model having a predefined shape in each of the scenes by reflecting shape information predefined in each of the scenes into the user model; and generating a file printable on a certain actual object to include at least one of the model images.

At least one variant, the character model includes a three-dimensional (3D) model which is a set of polygons including vertices, edges, and faces, and the shape information includes information on an angle of the 3D model and inter-vertex location relationships which specify a shape of the 3D model in each of the scenes.

In another variant, the metadata further includes information on an object which is representable together with the user model on the basis of a relative distance from the user model, and the generating of the user model comprises generating the user model by setting a relative distance between at least one vertex included in the user model and the object to be kept constant.

In another variant, the generating step of the user model comprises: generating a 3D shape which is skeletal information and a UV image which is texture information from the facial image; and generating a character model reflecting the facial image on the basis of the 3D shape and the UV image, and the generating of the model image comprises generating a blend shape model, which causes the character model to represent a predefined expression for the character, by reflecting the shape information in the character model.

In another variant, the generating step of the user model comprises: generating a modified image by changing at least one of brightness, an expression, and an angle applied to the facial image on the basis of a certain image conversion algorithm; generating a 3D shape which is skeletal information and a UV image which is texture information from the modified image; and generating a character model reflecting the facial image on the basis of the 3D shape and the UV image.

In another variant, the generating step of the user model further comprises an automatic post-correction operation of applying a cartoon filter to the UV image or the facial image or adjusting brightness of the UV image or the facial image according to a certain algorithm.

In another variant, the generating step of the user model further comprises a passive post-correction operation of applying a cartoon filter to the UV image or the facial image or adjusting brightness of the UV image or the facial image on the basis of a user setting.

In another variant, the metadata further includes information on an object applied to the character of a first scene and layer information which is an order in which the object and the character model are arranged in the first scene, and the generating of the user model comprises: generating the model image by applying shape information predefined for the character in the first scene to the user model; loading the object and the layer information applied to the first scene; and arranging the object and the model image according to the order of the layer information to generate a model image to be reflected in the character of the first scene.

In another variant, the metadata further includes information on a page of each of the scenes in which the character appears and information on a first location at which the character is present in the page, further comprising inserting the model image to page information and first location information corresponding to metadata of each the scenes to generate a custom page which reflects the user face at a position in the page of each of the scenes in which the character appears.

In another variant, the generating step of the printable file comprises: inserting the model image to a location of the character model in each of the scenes; generating a first image by extracting a predesignated first area including the model image inserted to each of the scenes; removing a background corresponding to surroundings of a second area, which is an area to be actually printed, predesignated in the first image; generating each of a plurality of second images showing a third area, which is an area to be used as a sticker cutoff line, predesignated in the second area; and arranging the plurality of second images in an area corresponding to a size of the actual object.

In another variant, the arranging step of the plurality of second images comprises arranging the plurality of second images according to second location information preset for the plurality of second images to be arranged in the area corresponding to the size of the actual object.

In another variant, the metadata further includes information on a page at which the character is present, information on a first location at which the character is present in the page, the information on a second location at which the plurality of second images will be arranged in the area corresponding to the size of the actual object, information on the first area, information on the second area, and information on the third area.

In another variant, the first and second location information and the first, second, and third area information include information on pixel coordinates, a horizontal size based on the pixel coordinates, and a vertical size based on the pixel coordinates.

In another embodiment, a computer program stored in a computer-readable recording medium to cause a processor to perform the above-described methods.

In other embodiments, an apparatus for generating a storybook includes: at least one memory configured to store instructions for performing a certain operation; and at least one processor operably connected to the at least one memory and configured to execute the instructions. The processor generates metadata including shape information which is a predefined value for specifying a shape that a character model has in each of scenes in which a character of storybook content appears, receives a facial image of a user, generates a user model based on a user face by applying texture information of the facial image to the character, generates a model image of the user model having a predefined shape in each of the scenes by reflecting shape information predefined in each of the scenes into the user model, and generates a file printable on a certain actual object to include at least one of the model images.

In further another embodiment, a method for generating a storybook performed by a storybook generation apparatus to generate a storybook. The method includes steps of: generating metadata including shape information which is a predefined value for specifying a shape that a character model has in each of scenes in which a character of storybook content appears; receiving a facial image of a user; generating a user model based on a user face by applying texture information of the facial image to the character; generating a model image of the user model having a predefined shape in each of the scenes by reflecting shape information predefined in each of the scenes into the user model; and inserting the model image to a location of the character model in each of the scenes in which the character appears to generate a custom page which reflects the model image at a position in a page of each of the scenes in which the character appears.

In addition, various effects which are directly or indirectly understood through this specification may be provided.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Advantages and features of the present disclosure and methods for achieving them will be apparent with reference to embodiments described below in detail with the accompanying drawings. However, the present disclosure is not limited to the embodiments disclosed below and may be implemented various forms. Rather, the embodiments are provided so that this disclosure will be thorough and complete and will fully convey the scope of the invention to those of ordinary skill in the art. The scope of the present disclosure is only defined by the claims.

In describing embodiments of the present disclosure, a detailed description of well-known functions or elements will be omitted unless actually necessary in order to describe embodiments of the present disclosure. The following terms are defined in consideration of the functionality in embodiments of the present disclosure and may vary depending on the intention, custom, or the like of a user or an operator. Therefore, the definition should be made on the basis of the overall content of this specification.

The functional blocks shown in the drawings and described below are merely examples of possible implementations. In other implementations, other functional blocks may be used without departing from the spirit and scope of the detailed description. Also, while one or more functional blocks of the present disclosure are represented as discrete blocks, one or more of the functional blocks of the present disclosure may be a combination of various hardware and software elements which perform the same function.

The inclusion of certain elements is merely an indication of the presence of the elements as an open-ended expression and should not be understood as excluding additional elements.

When an element is referred to as being connected or coupled to another element, the element may be directly connected or coupled to the other element, or still another element may be interposed therebetween.

In addition, the expressions, such as first and second, are used only to distinguish a plurality of elements and do not limit the order of elements or other features.

Hereinafter, exemplary embodiments of the present disclosure will be described below with reference to the drawings.

Figure 1:
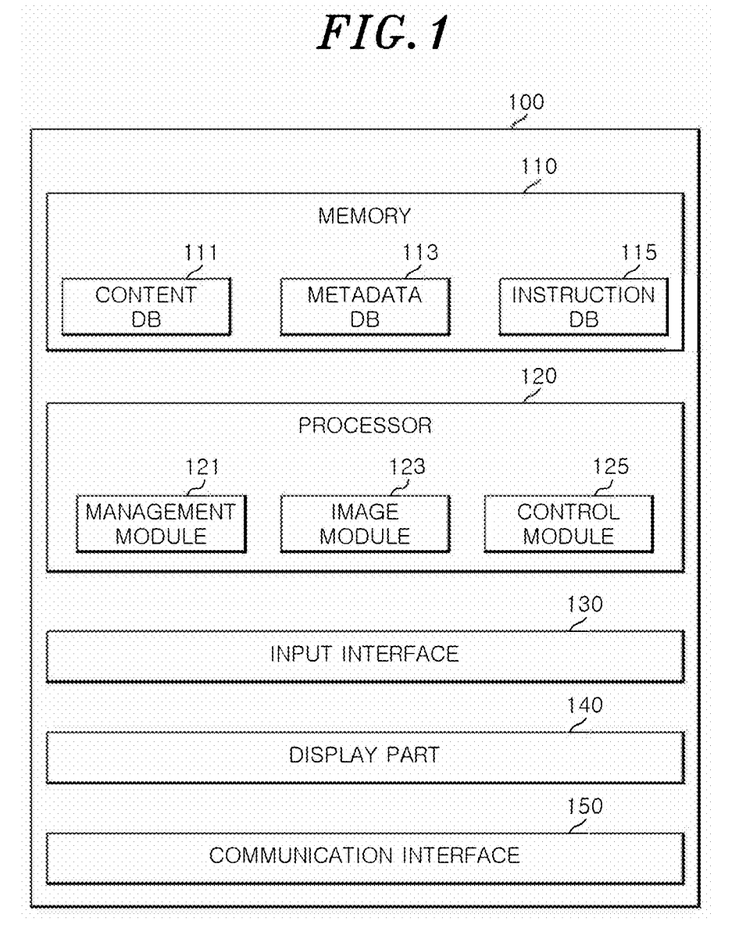
FIG. 1 is a functional block diagram of an apparatus for generating a storybook according to an exemplary embodiment of the present disclosure.

FIG. 1 is a functional block diagram of an apparatus 100 for generating a storybook according to an exemplary embodiment of the present disclosure. Referring to FIG. 1, the apparatus 100 for generating a storybook according to the exemplary embodiment may include a memory 110, a processor 120, an input interface 130, a display part 140, and communication interface 150.

The memory 110 may include a content database (DB) 111, a metadata DB 113, and an instruction DB 115 to store information and instructions for implementing exemplary embodiments of the present disclosure.

The content DB 111 may store information constituting the content of a storybook. For example, the content DB 111 may store information on a background, objects, and characters included in each page of the storybook.

Information on a character may include skeletal information representing the skeleton of the character and texture information which is the image of a surface put on the skeleton of the character. When the skeletal information of the character represents a three-dimensional (3D) shape and the texture information is a UV image or UV texture, the specific UV image is mapped to the 3D shape according to UV mapping in which rules about how to map an UV image to a 3D shape, that is, the skeleton of the character, are defined so that the character may be shaped.

The 3D shape may be configured in a mesh structure, which is the data of a geometrical model generated as a set of polygons including vertices, edges, and faces. The UV image is a two-dimensional (2D) image which is prepared to be three-dimensionally put on the surface of the 3D shape. A character model which is the shape of the character represented in the storybook may be generated by mapping pixels of the UV image to specific position of the 3D shape according to the rules defined in UV mapping and putting the texture on the skeleton of the character.

The metadata DB 113 may include shape information, object information, layer information, location information, and area information.

The shape information may include inter-vertex location relationships which specify an expression, angle, etc. of a character model and predefined values representing an angle of the character model in each scene of the storybook in which the character appears. For example, the shape information may include values regarding to which location and how far vertices, edges, or faces included in a 3D model move and values regarding at what angle the 3D model is rotated from the basic shape.

The object information may include information on an object which is arranged together with a character model in each scene in which the character appears. For example, the object may be a hat image, a hair image, an image representing the inside of the character's mouth, a clothes image, and the like. Also, the object information may include information on an object which may be represented together with a user model at a constant distance from the user model on the basis of the relative distance from a specific position of the user model even when the expression or shape of the user model is changed.

The layer information may include information on a sequence in which the character and the object appearing together with the character of a specific scene are arranged and shown in the storybook.

The location information may include information regarding on which page and at which positions an object, a character, etc. are arranged in the storybook. According to the exemplary embodiment of the present disclosure, first location information and second location information are distinguished from each other. First location information may include information on a page of a storybook on which a specific character is present and information on pixel coordinates or an area at which the character is present in the page. Second location information may include information on pixel coordinates or an area to which an image will be moved in order to move the image in a specific area in the storybook to another page.

The area information is information on an area to be extracted in order to extract a specific image from the storybook and may include information for specifying a certain area in a certain page. For example, the area information may include page information and information on coordinates of a specific pixel, a horizontal size based on the pixel coordinates and a vertical size based on the pixel coordinates so that information on an area to be extracted may be specified.

The instruction DB 115 may store instructions for causing the processor 120 to perform operations, which will be described below, or computer codes for performing operations corresponding to the operations of the processor 120 to be described below.

The processor 120 may control overall operation of the elements included in the apparatus 100 for generating a storybook, that is, the memory 110, the input interface 130, the display part 140, and the communication interface 150. The processor 120 may include a management module 121, an image module 123, and a control module 125. The processor 120 may operate the management module 121, the image module 123, and the control module 125 by executing the instructions stored in the memory 110. Operations performed by the management module 121, the image module 123, and the control module 125 may be understood as operations performed by the processor 120.

The management module 121 may perform an operation of generating or changing metadata. For example, the management module 121 may generate shape information, layer information, location information, and area information or modify values defined in the shape information, layer information, location information, and area information.

The image module 123 controls overall operation related to images. For example, when a facial image is input by a user, the image module 123 may generate a new image by altering or modifying the facial image according to a certain purpose and store the newly generated image as new content of the storybook.

The control module 125 may extract a specific image area according to metadata and generate a file which may be printed on an actual object by rearranging extracted images.

The input interface 130 may receive an input of the user or new information. The input interface 130 may include hardware modules such as a camera.

The display part 140 may include a hardware element which includes a display panel to output a video.

The communication interface 150 communicates with an external device to transmit and receive information. To this end, the communication interface 150 may include a wireless communication module or a wired communication module.

The flow of operations that the elements of the apparatus 100 for generating a storybook according to the exemplary embodiment perform in conjunction with each other will be described below with reference to FIGS. 2 to 9.

Figure 2:
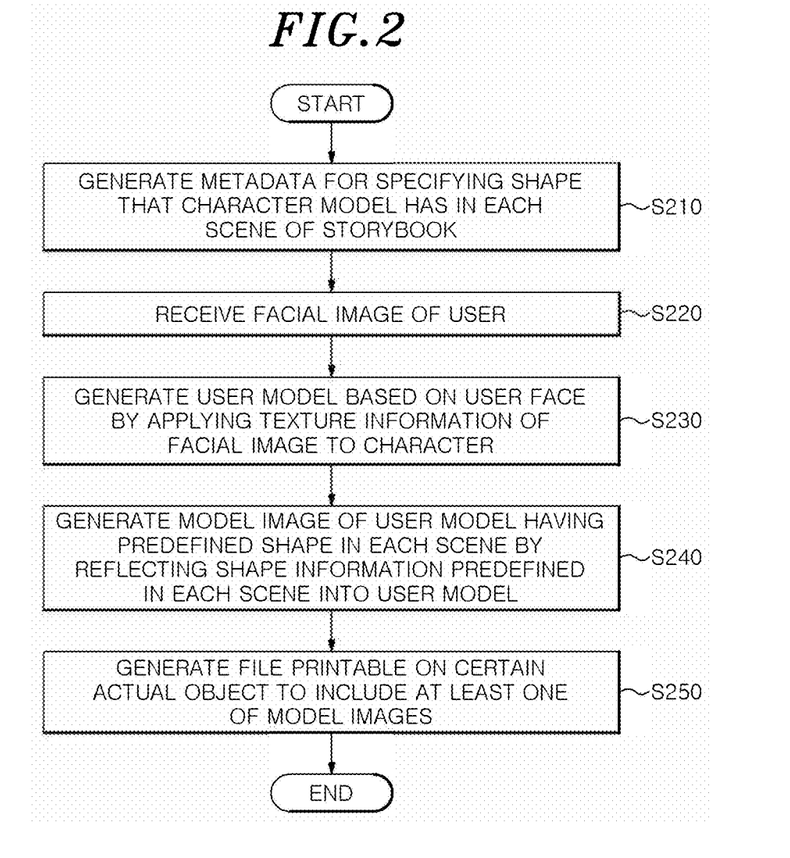
FIG. 2 is a flowchart illustrating a method performed by the storybook generation apparatus to generate a storybook according to the exemplary embodiment of the present disclosure.

FIG. 2 is a flowchart illustrating a method performed by the storybook generation apparatus 100 to generate a storybook according to the exemplary embodiment of the present disclosure. Each operation of the storybook generation method of FIG. 2 may be performed by the elements of the apparatus 100 for generating a storybook illustrated in FIG. 1, and each operation is as follows.

First, the management module 121 may generate metadata including shape information which is a predefined value for specifying a shape that a character model has in each scene in which the character of storybook content appears (S210).

Figure 4:
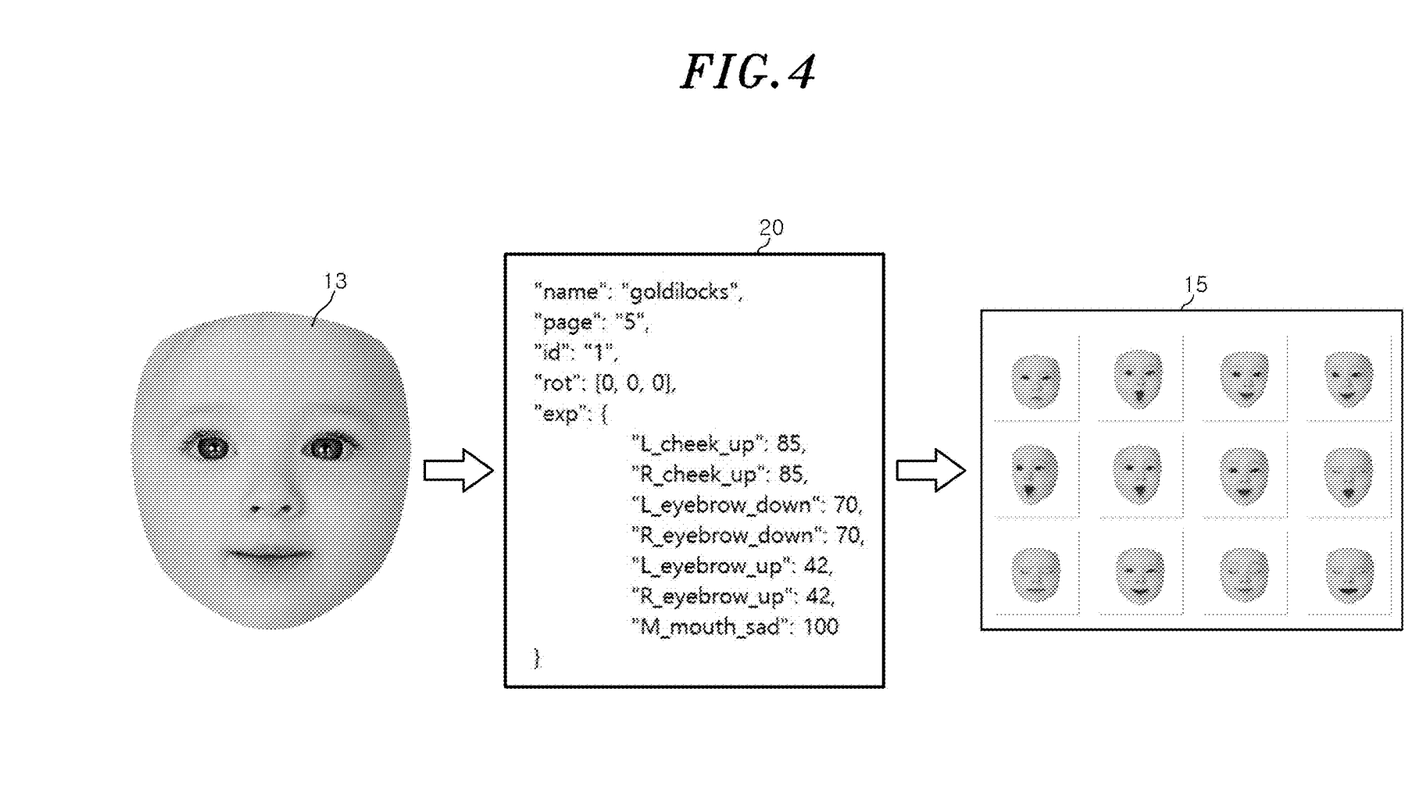
FIG. 4 is an example diagram illustrating an operation of generating a model image having a predefined form in each scene of a storybook by reflecting metadata in a user model according to the exemplary embodiment of the present disclosure.

For example, referring to FIG. 4, shape information 20 may include the title of the storybook ("name": "goldilocks"), a page of the storybook on which a specific character appears ("page": "5"), information for identifying the corresponding character ("id": "1"), values reflecting an angle by which the character model is rotated in a 3D space ("rot": [0, 0, 0]), and values for moving vertices, edges, or faces included in the character model in a certain direction ("L_cheek_up": 85 through "M_mouth_sad": 100). Such shape information may be defined in every scene of a character appearing in the storybook.

The input interface 130 may acquire a facial image of a user to be reflected in a character of the storybook (S220). The input interface 130 may acquire a facial image by photographing the user's face through a camera module or receiving an image file.

The image module 123 may generate a user model to be applied to a face portion of the character by inserting an actual face image of the user to a character model on the basis of the user's facial image. To this end, the image module 123 may generate a user model based on the user face by applying the texture information of the facial image to the character (S230).

Figure 3:
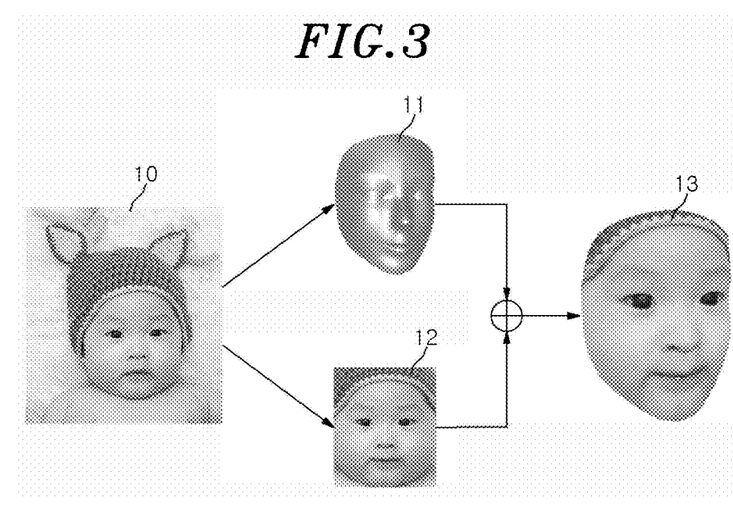
FIG. 3 is an example diagram illustrating an operation of generating a user model reflecting a user's facial image according to the exemplary embodiment of the present disclosure.

FIG. 3 is an example diagram illustrating an operation of generating a user model reflecting a user's facial image according to the exemplary embodiment of the present disclosure.

Referring to FIG. 3, the image module 123 may generate a 3D shape 11 which is skeletal information and a UV image 12 which is texture information from a user's facial image. On the basis of UV mapping in which rules about how to map the UV image 12 to the 3D shape 11 are predefined, pixels of the UV image 12 are mapped to specific positions of the 3D shape 11. In this way, the texture is put on the skeleton of a character so that a user model 13 may be generated. For example, the image module 123 may generate a 3D shape from a user's facial shape using a 3D face shape generation technique, a 3D face shape regression technique, or the like based on deep learning.

The terms "character model" and "user model" are distinguished as follows. A "character model" has a meaning including the 3D model obtained by putting a UV image of a basic character who appears in the storybook on a 3D shape of the basic character. A "user model" has a meaning including a model generated on the basis of UV mapping in which rules about how to map the UV image 12, which is the texture information generated from the user's facial image, to the 3D shape 11, which is the skeletal information generated from the user's facial image, as shown in FIG. 3 are predefined.

The image module 123 may perform automatic post-correction for applying a cartoon filter to a UV image or a facial image, or adjusting brightness of the UV image or the facial image according to at least one algorithm among a generative adversarial network (GAN), an autoencoder, the cartoon filter, bilateral filtering, and an image processing technique. Also, the image module 123 may perform a manual post-correction for applying a cartoon filter to a UV image or a facial image, or adjusting brightness of the UV image or the facial image on the basis of a setting of the user.

The image module 123 may generate a model image of the user model having a predefined shape in each scene by reflecting shape information predefined in each scene in which the character appears in the user model (S240). Here, the model image may include a blend shape model of which a certain expression or motion is made in the generated user model.

Meanwhile, when the input facial image is too bright or the facial image does not look straight ahead, the image module 123 may generate a modified image by changing at least one of brightness, an expression, and an angle applied to the facial image on the basis of a certain image conversion algorithm such as a GAN or an autoencoder. Accordingly, the image module 123 may generate a 3D shape which is skeletal information and a UV image which is texture information and generate a character model which reflects the facial image on the basis of the 3D shape and the UV image.

FIG. 4 is an example diagram illustrating an operation of generating a model image having a predefined shape in each scene of a storybook by reflecting metadata in a user model according to the exemplary embodiment of the present disclosure.

Referring to FIG. 4, the image module 123 may perform control so that the shape of a user model (e.g., vertices, edges, and faces) may be modified according to information defined in the shape information 20. The shape information may include the title of the storybook ("name": "goldilocks"), a page of the storybook on which a specific character appears ("page": "5"), information for identifying the corresponding character ("id": "1"), values reflecting an angle by which the character model is rotated in a 3D space ("rot": [0, 0, 0]), and values for moving vertices, edges, or faces included in the character model in a certain direction ("L_cheek_up": 85 through "M_mouth_sad": 100).

Figure 5:
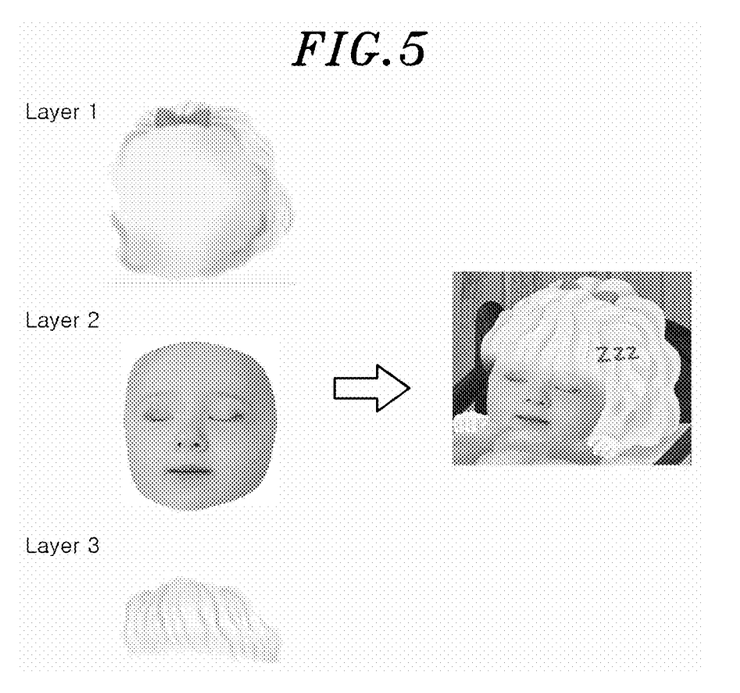
FIG. 5 is an example diagram illustrating an operation of generating a model image to be reflected in a character by arranging objects and a model image on the basis of layer information according to the exemplary embodiment of the present disclosure.

Accordingly, the image module 123 may specify a target to be modified according to the storybook, page, and character defined in the shape information, modify the shape of the user model instead of the character model according to a value determined to rotate a model or move the shape of the model, and arrange an object to be represented together with the user model as shown in FIG. 5.

In this case, the image module 123 may set the relative distance between at least one vertex included in the user model and a certain object to be kept constant on the basis of object information included in metadata and thereby generate a user model represented together with a specific object. Accordingly, even when the expression or shape of the user model is changed according to shape information, the specific object may be represented together with the user model at the constant distance from the user model, and the specific object may be represented at the constant distance from the user model in every scene of the storybook in which a specific character appears.

FIG. 5 is an example diagram illustrating an operation of generating a model image to be reflected in a character by arranging objects and a model image on the basis of layer information according to the exemplary embodiment of the present disclosure.

Referring to FIG. 5, the image module 123 may generate a model image by applying shape information which is predefined for a character in a specific scene to a user model and then load object information and layer information applied to the scene with reference to metadata. For example, when object information arranged on a character in a specific scene is "front hair" and "back hair" and arrangement order based on layer information is "the first layer—back hair, the second layer—model image, and the third layer—front hair," layers are arranged in the order, that is, the back hair, the model image, and the front hair so that a model image to be reflected in the scene may be generated.

Figure 6:
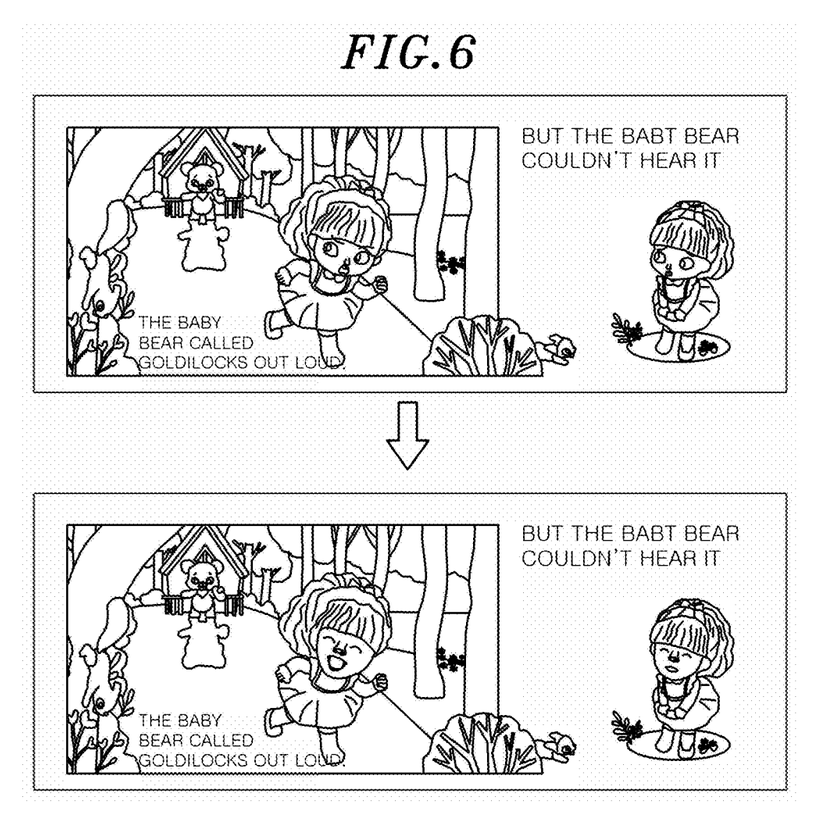
FIG. 6 is an example diagram illustrating an operation of generating a custom page reflecting a user face at positions in a page of a storybook on which a character appears according to the exemplary embodiment of the present disclosure.

FIG. 6 is an example diagram illustrating an operation of generating a custom page reflecting a user face at positions in a page of a storybook on which a character appears according to the exemplary embodiment of the present disclosure.

Referring to FIG. 6, when model images are generated, the control module 125 may insert the generated model images to each scene of a storybook in which a character appears at once with reference to first location information of metadata. Accordingly, it is possible to generate a custom storybook including custom pages which reflects a user's facial image as a specific character from a basic storybook in which the basic character appears.

Meanwhile, models configured in three dimensions are put in a virtual 3D space and output according to the viewpoint of a virtual camera which is located at a certain location in the virtual space. When a storybook which is output on a 2D paper or a 2D screen reflects a model image of a 3D model, a model image which is one of the user models configured in three dimensions may be output on the 2D paper or screen, which may result in a sense of difference. Accordingly, in the case of reflecting a model image of a 3D model in a storybook printed in two dimensions, the control module 125 may perform operation according to the following exemplary embodiment.

First, the control module 125 may load a model image which is a 3D model to be reflected in a storybook to a virtual 3D space. Subsequently, the control module 125 may determine the location of a virtual camera for photographing a model image in the virtual space and generate a 2D image obtained by photographing the model image after setting the focal length of the virtual camera to a finite value. The focal length denotes the distance between a focal point at which light transmitted from an object is concentrated and a reference point of the object. According to the exemplary embodiment, the focal length of a virtual camera present in a virtual space may indicate the distance between a model image and a focal point at which light transmitted from the model image is concentrated in the virtual space on the assumption that rays are present in the virtual space. In other words, the control module 125 may cause light to be projected from the 3D model toward a certain focal point by setting a focal length so that a 3D model image may be formed at the focal point, and the control module 125 may generate a 2D image representing 3D effects by photographing an object with the virtual camera between the 3D model and the focal point.

Subsequently, the control module 125 may set the focal length of the virtual camera to be infinitive and generate a custom page by reflecting the 2D image in an area corresponding to information on a first location at which a character face is present in a background image corresponding to page information which will reflect the model image.

In other words, since the background image of the storybook is two dimensional and does not represent 3D effects, it is necessary to project light, which is projected from the image to the virtual camera, in a direction orthogonal to the 2D image (i.e., to have an infinitive focal length) so that no distortion may occur in the image. To this end, in the virtual space, the focal length is set so that the background and the generated 2D image may be formed at a focal point which is at an infinite distance. Then, rays of light projected from the background and the 2D image are projected in parallel toward the infinite focal point so that a custom page may be generated.

Meanwhile, the custom page and a custom storybook generated according to the above-described process is digital content stored in a computer. According to the above-described process, the digital storybook is completed to reflect the user's facial image in each scene. However, when each user prints a storybook reflecting his or her own face as a paper book, users separately prints their books, which leads to a surge in manufacturing costs.

Accordingly, a technology for providing a model image, which is applied to each scene of a storybook in which a character appears, in a form attachable to a paper storybook in which a basic character is printed is described with reference to the examples of FIGS. 7 to 9.

Figure 7:
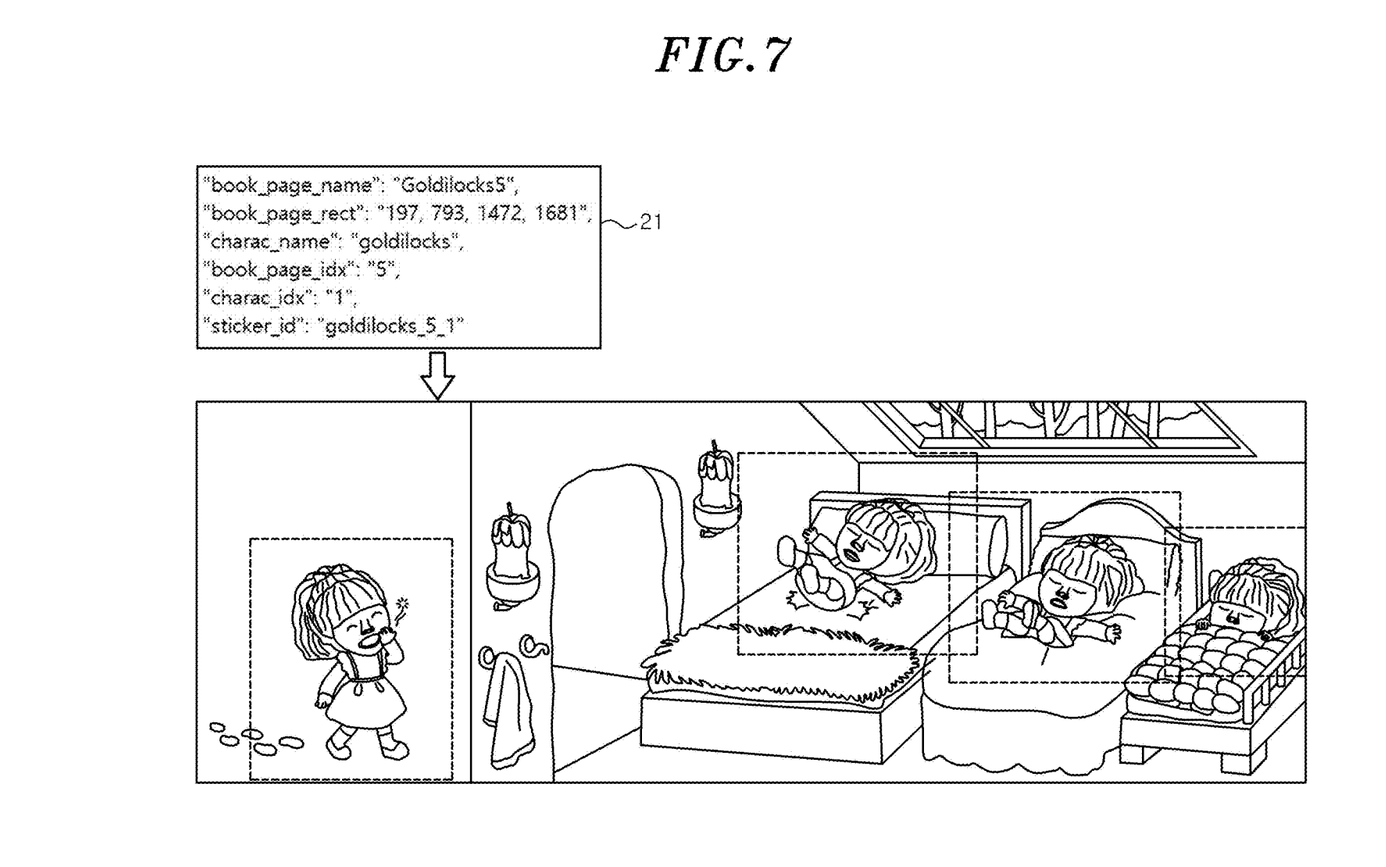
FIG. 7 is an example diagram illustrating an operation of extracting a first image corresponding to a first area in which a character appears from a storybook in order to generate a sticker according to the exemplary embodiment of the present disclosure.

FIG. 7 is an example diagram illustrating an operation of extracting a first image 16 corresponding to a first area in which a character appears from a storybook in order to generate a sticker according to the exemplary embodiment of the present disclosure.

Referring to FIG. 7, the control module 125 may generate a file which is printable on a certain actual object to include at least one of model images generated as described above (S250).

When the user's model image is inserted to a position of each scene at which a specific character appears in the storybook, the control module 125 may generate the first image 16 by extracting a predesignated first area including the model image inserted into each scene with reference to area information of metadata. For example, referring to metadata 21 of FIG. 7, the metadata 21 may include the filename of a page on which the character appears in the storybook ("book_page_name": "Goldilocks5"), [an x coordinate, a y coordinate, a horizontal length, a vertical length] for specifying a first area ("book_page_rect": "197, 793, 1472, 1681"), character name information ("charac_name": "goldilocks"), identification information of the page on which the character appears in the storybook ("book_page idx": "5"), character identification information ("charac_idx": "1"), sticker identification information (sticker_id": "goldilocks_5_1"), and the like. Accordingly, the control module 125 may extract a first area set in each piece of metadata. For example, as shown in the lower picture of FIG. 7, the first image 16 may be generated by extracting areas each corresponding to "goldilocks_15_1, goldilocks_16_1, goldilocks_16_2, goldilocks_16_3."

Figure 8:
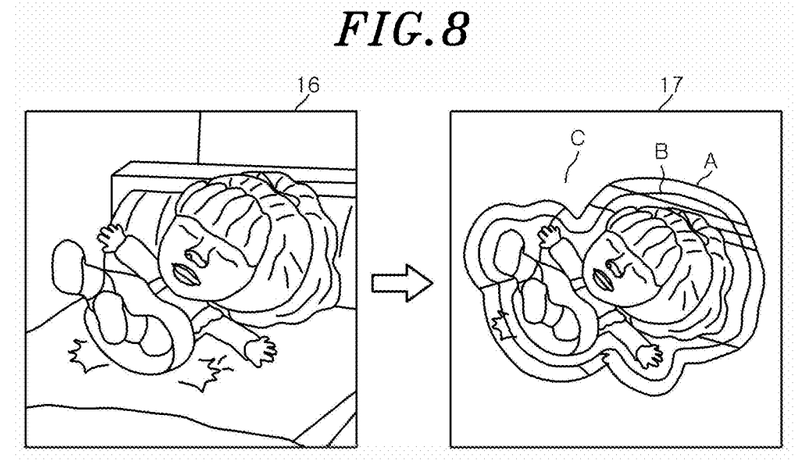
FIG. 8 is an example diagram illustrating an operation of generating a second image showing a second area to be actually printed as a sticker and a third area to be used as a cutoff line of the sticker in a first image according to the exemplary embodiment of the present disclosure.

FIG. 8 is an example diagram illustrating an operation of generating a second image 17 showing a second area A to be actually printed as a sticker and a third area B to be used as a cutoff line of the sticker in the first image 16 according to the exemplary embodiment of the present disclosure.

Referring to FIG. 8, the control module 125 may leave the predesignated second area A, which will be actually printed as an image on a sticker, in the first image 16 and remove a background C corresponding to surroundings of the second area A. Also, the control module 125 may generate the second image 17 showing the predesignated third area B as an area to be used as a cutoff line of the sticker in the second area A.

Figure 9:
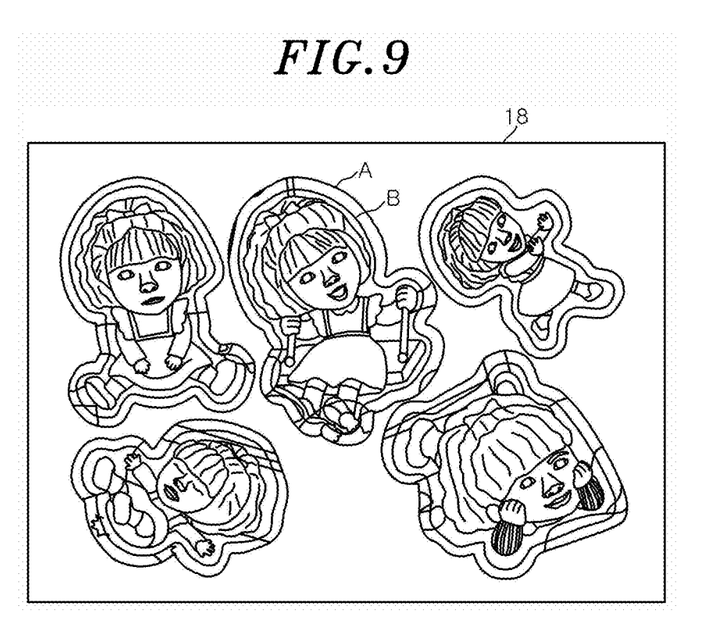
FIG. 9 is an example diagram illustrating an operation of arranging a plurality of second images to be used as stickers in an area corresponding to the size of an actual object according to the exemplary embodiment of the present disclosure.
Figure 10:
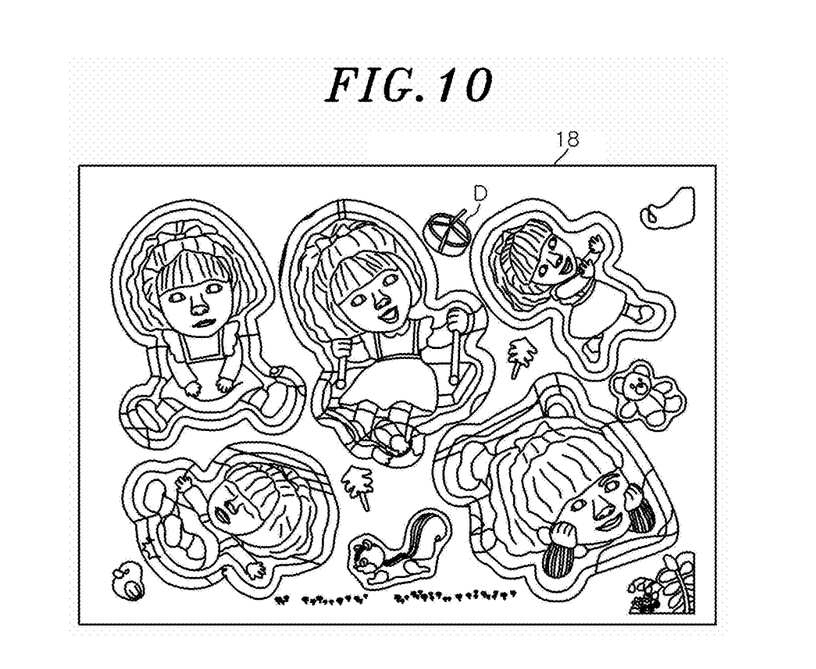
FIG. 10 is another example diagram illustrating the operation of arranging a plurality of second images to be used as stickers in an area corresponding to the size of an actual object according to the exemplary embodiment of the present disclosure.

FIGS. 9 and 10 are example diagrams illustrating an operation of arranging a plurality of second images 17 to be used as stickers in an area 18 corresponding to the size of an actual object according to the exemplary embodiment of the present disclosure.

Referring to FIG. 9, the control module 125 may rearrange the plurality of second images 17 to output the plurality of second images 17 as stickers so that the plurality of second images 17 may be printed in an object having a limited area. For example, the control module 125 may rearrange the plurality of second images 17 at positions predesignated in second location information of the metadata in the area 18 corresponding to the size of an actual object to be used as a sticker paper. Accordingly, as shown in FIG. 9, an image file having a certain size (e.g., the size of the area 18 of FIG. 9) or a certain resolution (e.g., the resolution of the area 18 of FIG. 9) including the plurality of rearranged second images 17 may be stored so that a file printable on the actual object corresponding to the size or resolution (e.g., an image file such as jpg, bmp, or tiff) may be generated. Also, the file generated according to the exemplary embodiment of the present disclosure may be used not only for stickers but also for printing on various objects such as a doll and a pillow.

Referring to FIG. 10, the control module 125 may not only rearrange the plurality of second images 17 as described with reference to FIG. 9 but also additionally arrange certain images D at predesignated positions to generate a printable file to output the objects of the ornament images D together with the second images 17.

In each scene of a storybook in which a character appears, the apparatus 100 for generating a storybook according to the above-described embodiments generates a new image reflecting an expression and shape applied to the character in a user's facial image and makes it possible to provide a sticker reflecting the user's facial image in a form which is attachable directly to a paper storybook. According to the exemplary embodiment, when facial images of various users are input, the above-described operation is uniformly applied to each of the facial images. Accordingly, it is possible to generate a custom storybook reflecting information each user through an automated process, and it is also possible to automatically generate a printable file of character stickers reflecting the user's face.

In this way, even in the case of providing a storybook obtained by inserting each individual user's facial information to a paper fairy tale book, it is unnecessary to print a book including each individual user's image for the individual user, and it is possible to print a large number of basic storybooks and then provide stickers which reflect each individual user's facial image together.

Accordingly, each individual user does not need to separately order printing of a storybook for himself or herself and can order a personalized storybook of which price is reduced by receiving stickers reflecting the user's facial image together with a basic storybook. Also, a user can make a personalized storybook using stickers reflecting his or her own facial image and thus can be further interested in the storybook.

Further, a storybook producer can automatically generate a custom storybook and character stickers which reflect information of a user from only a facial image input by the user. Consequently, it is possible to effectively and remarkably reduce time and costs for generating a custom storybook and character stickers.

The above-described embodiments of the present disclosure may be implemented with various means. For example, the embodiments of the present disclosure may be implemented in hardware, firmware, software, combinations thereof, or the like.

In the case of implementation by hardware, the method according to the embodiments of the present disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

In the case of implementation by firmware or software, the method according to the embodiments of the present disclosure may be implemented in the form of a module, procedure, or function for performing the above-described functions or operations. A computer program recorded with software code or the like may be stored in a computer-readable recording medium or a memory unit and driven by a processor. The memory unit is located inside or outside the processor and may exchange data with the processor in various well-known ways.

Combinations of the individual blocks of the block diagram and flowchart attached to the present disclosure may also be performed by computer program instructions. These computer program instructions may be embedded in an encoding processor of a general-purpose computer, a special-purpose computer, or other programmable data processing apparatus so that the instructions performed through the encoding processor of a computer or other programmable data processing apparatus generate units for performing the functions described in each block of the block diagram or each operation of the flowchart. These computer program instructions may also be stored in a computer-usable or computer-readable memory capable of aiming for a computer or other programmable data processing equipment to implement the functionality in a particular manner. Accordingly, the instructions stored in the computer-usable or computer-readable memory may produce a manufacturing item containing instructions for performing functions described in each block of the block diagram or each operation of the flowchart. The computer program instructions may also be stored on a computer or other programmable data processing equipment. Accordingly, instructions, which are executed by a computer or other programmable data processing equipment to perform a series of operations on the computer or the programmable data processing equipment and generate a process performed by the computer, may also provide operations for performing functions described in each block of the block diagram or each operation of the flowchart.

In addition, each block or each operation may represent a part of a module, segment, or code that includes one or more executable instructions for executing a specified logical function. It is to be noted that in some alternative embodiments, functions mentioned in blocks or operations may occur output order. For example, two blocks or operations shown consecutively may be performed substantially concurrently in practice, or the blocks or operations may sometimes be performed in reverse order according to the corresponding function.

As such, those of ordinary skill in the art will appreciate that the present disclosure may be embodied in other specific forms without departing from the spirit or essential characteristics thereof. Therefore, the above-described embodiments are to be construed as illustrative and not restrictive in all aspects. The scope of the present disclosure is defined by the following claims rather than the detailed description, and it is understood that the present disclosure covers all modifications and alterations derived from the meaning and scope of the claims and their equivalents.

What is claimed is:

1. A method for generating a storybook performed with a storybook generation apparatus, the method comprising:
    generating metadata including shape information which is a predefined value for specifying a shape that a character model has in each of scenes in which a character of storybook content appears;
    receiving a facial image of a user;
    generating a user model based on the facial image of a user by applying texture information of the facial image to the character;
    generating a model image of the user model having a predefined shape in each of the scenes by reflecting shape information predefined in each of the scenes into the user model; and
    generating a file printable on a predetermined actual object to include at least one of model images;
    wherein the generating step of the metadata further comprises generating the metadata that includes information on an object which is representable together with the user model on a basis of a first relative distance from the user model, and
    the generating step of the user model further comprises generating the user model by setting, a second relative distance between at least one vertex included in the user model and the object, to be kept constant.

2. The method of claim 1, wherein the character model includes a three-dimensional (3D) model which is a set of polygons including vertices, edges, and faces, and
    the shape information includes an angle of the 3D model and inter-vertex location relationships which specify a shape of the 3D model in each of the scenes.

3. The method of claim 2, wherein the generating steps of the user model further comprises:
    generating a 3D shape which is skeletal information and a UV image which is the texture information from the facial image; and
    generating the character model reflecting the facial image based on the 3D shape and the UV image, and
    the generating step of the model image further comprises generating a blend shape model, which causes the character model to represent a predefined expression for the character, by reflecting the shape information in the character model.

4. The method of claim 2, wherein the generating steps of the user model further comprises:
   generating a modified image by changing at least one of brightness, an expression, and an angle applied to the facial image by way of a selected image conversion algorithm;
   generating a 3D shape which is skeletal information and a UV image which is texture information from the modified image; and
   generating a modified character model reflecting the facial image on the basis of the 3D shape and the UV image.

5. The method of claim 4, wherein the generating step of the user model further comprises:
   an automatic post-correction operation of applying a cartoon filter to the UV image or the facial image or
   adjusting brightness of the UV image or the facial image according to a predetermined algorithm.

6. The method of claim 4, wherein the generating step of the user model further comprises a passive post-correction operation of applying a cartoon filter to the UV image or the facial image or adjusting brightness of the UV image or the facial image on the basis of a user setting.

7. The method of claim 1, wherein the generating step of metadata further comprises generating the metadata that includes information on an object applied to the character of a first scene and layer information which is an order in which the object and the character model are arranged in the first scene, and
   the generating step of the user model further comprises:
      generating the model image by applying shape information predefined for the character in the first scene to the user model;
      loading the object and the layer information applied to the first scene; and
      arranging the object and the model image according to the order of the layer information to generate a model image to be reflected in the character of the first scene.

8. The method of claim 1, wherein the metadata further includes information on a page of each of the scenes in which the character appears and information on a first location at which the character is present in the page,
   further comprising inserting the model image to page information and first location information corresponding to the metadata of each the scenes to generate a custom page which reflects the user face at a position in the page of each of the scenes in which the character appears.

9. The method of claim 1, wherein the generating step of the file printable further comprises:
   inserting the model image to a location of the character model in each of the scenes;
   generating a first image by extracting a predesignated first area including the model image inserted to each of the scenes;
   removing a background corresponding to surroundings of a second area, which is an area to be actually printed, predesignated in the first image;
   generating each of a plurality of second images showing a third area, which is an area to be used as a sticker cutoff line, predesignated in the second area; and
   arranging the plurality of second images in an area corresponding to a size of the actual object.

10. The method of claim 9, wherein the arranging step of the plurality of second images comprises arranging the plurality of second images according to second location information preset for the plurality of second images to be arranged in the area corresponding to the size of the actual object.

11. The method of claim 10, wherein the metadata further includes information on a page at which the character is present, information on a first location at which the character is present in the page, the information on a second location at which the plurality of second images will be arranged in the area corresponding to the size of the actual object, information on the first area, information on the second area, and information on the third area.

12. The method of claim 11, wherein the first and second location information and the first, second, and third area information include information on pixel coordinates, a horizontal size based on the pixel coordinates, and a vertical size based on the pixel coordinates.

13. A computer program stored in a non-transitory computer-readable recording medium to cause a processor to perform the method of claim 1.

14. A method for generating a storybook and performed by a storybook generation apparatus, the method comprising:
   generating metadata including shape information which is a predefined value for specifying a shape that a character model has in each of scenes in which a character of storybook content appears;
   receiving a facial image of a user;
   generating a user model based on a user face by applying texture information of the facial image to the character;
   generating a model image of the user model having a predefined shape in each of the scenes by reflecting shape information predefined in each of the scenes into the user model; and
   inserting the model image to a location of the character model in each of the scenes in which the character appears to generate a custom page which reflects the model image at a position in a page of each of the scenes in which the character appears;
   wherein the generating step of the metadata further comprises generating the metadata that includes information on an object which is representable together with the user model on the basis of a first relative distance from the user model, and
   the generating step of the user model further comprises generating the user model by setting a second relative distance between at least one vertex included in the user model and the object to be kept constant.

15. An apparatus for generating a storybook, the apparatus comprising:
   at least one memory configured to store instructions for performing a selected operation; and
   at least one processor operably connected to the at least one memory and configured to execute the instructions,
   wherein the at least one processor generates metadata including shape information which is a predefined value for specifying a shape that a character model has in each of scenes in which a character of storybook content appears,
   receives a facial image of a user,
   generates a user model based on a user face by applying texture information of the facial image to the character,
   generates a model image of the user model having a predefined shape in each of the scenes by reflecting shape information predefined in each of the scenes into the user model, and
   generates a file printable on a predetermined actual object to include at least one of the model images;

wherein the generating step of metadata further comprises generating the metadata that includes information on an object which is representable together with the user model on the basis of a first relative distance from the user model, and the generating step of the user model further comprises generating the user model by setting, a second relative distance between at least one vertex included in the user model and the object, to be kept constant.

* * * * *